Sept. 25, 1956  R. H. GADDIE  2,764,423
VELOCIPEDE WITH STEERABLE REAR WHEELS
Filed May 19, 1954  2 Sheets-Sheet 1
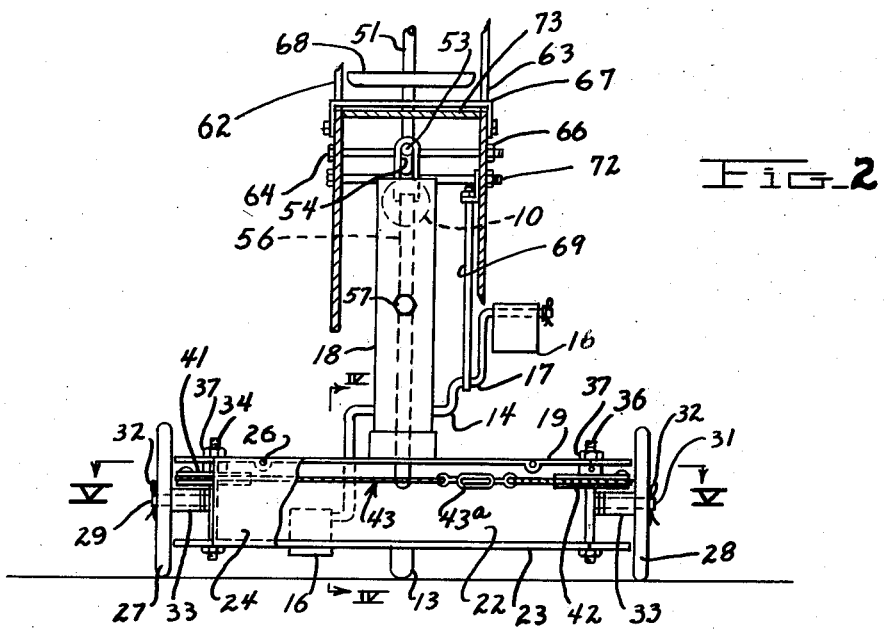
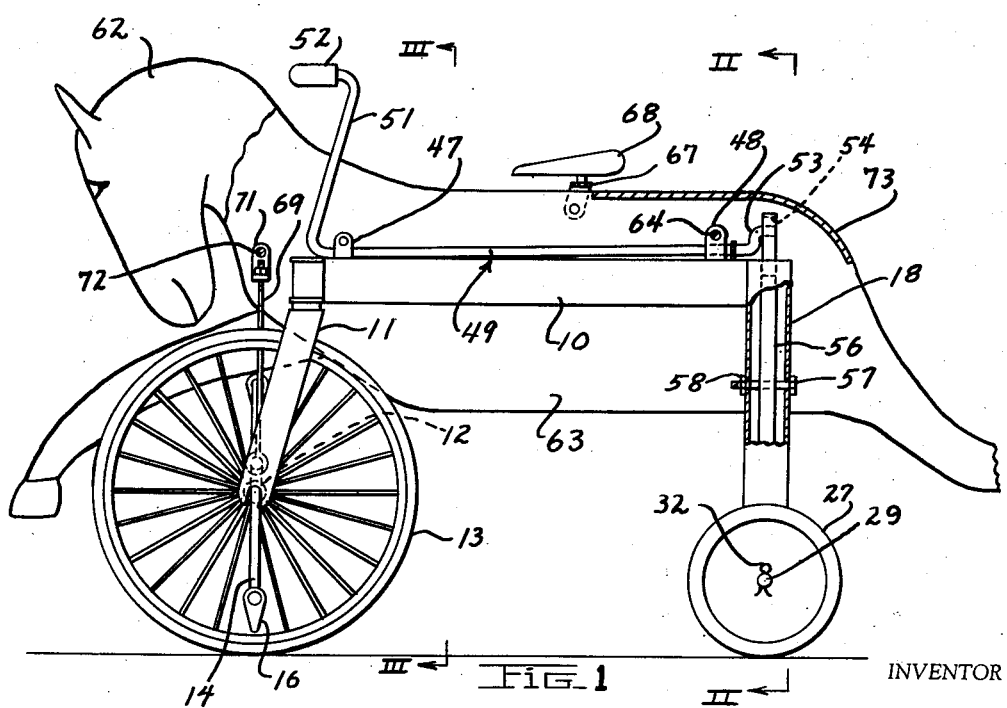
INVENTOR
RUTHERFORD H. GADDIE
BY Jennings & Carter
ATTORNEYS

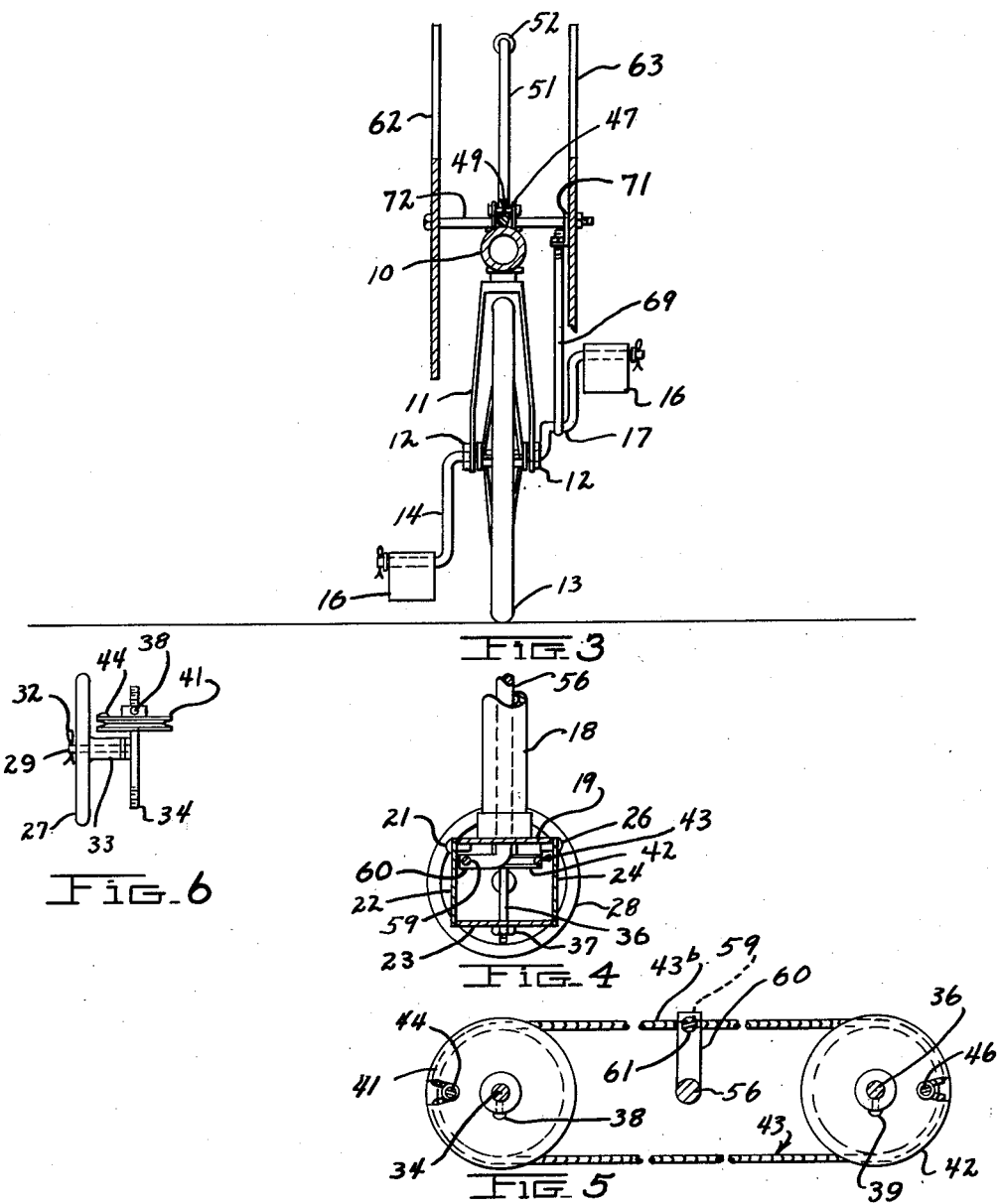

United States Patent Office 2,764,423
Patented Sept. 25, 1956

2,764,423

VELOCIPEDE WITH STEERABLE REAR WHEELS

Rutherford H. Gaddie, Bowling Green, Ky.

Application May 19, 1954, Serial No. 430,787

4 Claims. (Cl. 280—269)

My invention relates to a velocipede and has for an object the provision of a velocipede in which the front driving wheel, rotated by the rider in the usual manner by pedals, is fixed for rotation in a single vertical plane, and in which the rear wheels are steerable through an improved and effective steering mechanism.

My invention relates more particularly to an improved mounting for the rear steerable wheels and contemplates construction in which the rear wheels are mounted for rotation on stub axles carried by vertical pins which are rotatably supported in the frame of the vehicle, together with control means to rotate the pins, thereby steering the velocipede.

My invention contemplates a velocipede having steerable rear wheels mounted as set forth above and in which the vertical pins supporting the axles each have fixed thereto a horizontally disposed pulley, there being a flexible member passing over the pulleys, together with an oscillatable connecting link fastened at its lower end to one flight of the flexible member, whereby upon oscillation of the link the wheels are turned to steer the velocipede.

Another object of my invention is to provide a velocipede having the foregoing features in which the seat for the rider is mounted on a body which, for the purpose of ornamentation, may be made to represent a horse or the like, together with a crank and a connecting link secured to the body, so that upon rotation of the front wheel the pivotaly mounted rider carrying body oscillates up and down, simulating the motion of a horse or other animal.

A further and more detailed object of my invention is to provide a velocipede of the character designated in which the steering mechanism is substantially enclosed within the housing or cover plates for the vehicle so that the parts thereof are entirely protected and enclosed to prevent injury to the user of the vehicle.

A velocipede illustrating the features of my invention is shown in the accompanying drawings froming a part of this application in which:

Fig. 1 is a vertical view, partly in section, and with one side plate of the rider carrying body broken away in order to illustrate the construction of the frame of my improved velocipede;

Fig. 2 is a rear detail sectional view taken generally along line II—II of Fig. 1;

Fig. 3 is a detail sectional view taken on line III—III of Fig. 1;

Fig. 4 is a detail sectional view taken generally along line IV—IV of Fig. 2;

Fig. 5 is an enlarged detail sectional view, partly broken away, and taken generally along line V—V of Fig. 2; and, Fig. 6 is a view of one of the rear steerable wheel, axle and vertical pin assemblies removed from the framework of the velocipede.

Referring now to the drawings for a better understanding of my invention, my improved velocipede comprises a frame having a horizontal member 10 which for the sake of lightness may be in the form of a tube. Secured to the forward end of the tube 10 as by welding or otherwise is a front fork 11. Journalled on suitable bearings 12 in the front fork is a front wheel 13 which is rotated by means of the usual crank 14 having pedals 16 at the ends thereof. For a purpose later to appear one of the cranks 14 may have an auxiliary offset crank portion 17 thereon. It will thus be seen that in my improved velocipede the fork carrying the front wheel is rigidly connected to the tube 10.

Depending from and rigidly secured to the rear end of the horizontal frame member 10 is a vertically disposed tubular column 18. Welded or otherwise secured to the lower end of the column 18 is a horizontal cross frame member 19. Secured to the front side of the frame member 19 by means of screws 21 is a depending cover plate 22. Welded to the bottom edge of the plate 22 is a horizontally disposed frame plate 23 which in turn is welded along its other edge to a vertically disposed cover plate 24. Plate 24 likewise is secured to the plate 19 by means of screws 26. The construction just described affords a rectangular transverse beam carried rigidly by the lower end of the column 18 and which the side plates 22 and 24 and the bottom plate 23 may be removed by removing the screws 21 and 26.

The rear wheels 27 and 28 are mounted on horizontal stub axles 29 and 31, respectively. Cotter pins 32 serve to hold the wheels on the axles. Also, the wheels may be provided with integrally carried bosses 33 to form a relatively long bearing surface on the horizontal axles 29 and 31.

The inner ends of the axles 29 and 31 are welded respectively to vertically disposed pins 34 and 36 which project through the upper frame plate member 19 and through the lower plate frame member 23. The ends of the pins may be threaded and may be held rotatably in place by means of nuts 37. Non-rotatably secured to the pins 34 and 36 as by means of set screws 38 and 39 are horizontally disposed pulleys 41 and 42. Passing around the pulleys 41 and 42 is a flexible member, for instance a wire cable, 43. The cable 43 is rigidly affixed to the pulleys 41 and 42 by means of screws 44 and 46 as shown more particularly in Fig. 5 of the drawings. A turnbuckle 43a serves to maintain the cable taut in the usual manner for such devices.

Lying parallel to the member 10 and supported for oscillation thereon by means of bearings 47 and 48 is a steering rod 49 which has a vertically upstanding portion 51 with a rider's handle 52 thereon. The rear end of the rod 49 is upset to provide a crank 53. The crank 53 fits in a vertically elongated opening 54 provided in the upper end of a steering link 56. As shown, the link 56 extends through the vertical frame tube 18 and is pivoted intermediate its ends to said tube by means of a bolt 57 held in place by a nut 58. The steering link 56 projects through the lower end of the tube 18 and is provided with a horizontally and forwardly turned end portion 60. See Figs. 4 and 5. The end portion 60 is provided with a horizontally disposed opennig 59 through which passes one flight 43b of the cable 43. The cable is secured to the portion 60 by means of a set screw 61. Therefore, it will be apparent that when the link 56 oscillates about the bolt 57, flight 43b of the cable is pulled either to the right or left, thereby turning both of the wheels 27 and 28 in unison, either to the right or left, as the case may be, thus to steer the velocipede.

My improved velocipede may be provided with a rider carrying body composed of side plate-like members 62 and 63 which may be cut out to the shape of a horse, or other animal for ornamentation purposes. The entire body may be pivoted adjacent the rear on a cross bolt 64 mounted in brackets 48 carried on the member 10. A nut 66 may secure the body pivotally to the rod. Spanning the side plate members 62 and 63 is a bar 67 which may carrying the rider's seat 68.

Mounted on the crank 14 is a link 69 which extends upwardly and which is connected by a bracket 71 to a forward portion of the side plates 62 and 63. The bracket 71 may be pivotally mounted on a cross bolt 72 spanning the members 62 and 63, as best shown in Fig. 3.

From the description given the method of constructing and using my improved velocipede and the advantages thereof will be readily understood. It will be apparent that a child seated upon the seat 68 may propel the vehicle with his feet in the usual manner through the pedals 16. By moving rod 51 to the right or left the crank portion 53 on the rear end thereof oscillates the steering link 56 to the right or left, causing its lower horizontally turned end 60 to move to the right or left, thus rotating the pulleys 41 and 42 and consequently turning the rear wheels to the right or left, in unison. I have found that the upstanding steering bar and handle 52, constituting a sort of tiller, afford a most convenient means for a child to steer my improved velocipede. Further, it will be apparent that by properly locating the bolt 57 relative to the ends of the link 56, the amount of leverage and the total steering movement of the rear wheels 27 and 28 may be regulated. As the vehicle is propelled along it will be seen that the front end of the rider carrying body moves up and down, affording the sensation of riding a horse. It will also be noted that all of the steering mechanism is fully enclosed. Through the medium of the horizontally disposed pulleys on the vertically arranged axle carrying pins 34 and 36, I am enabled completely to enclose all of that part of the steering mechanism within the built up horizontal framework at the lower end of the column 18. Since link 56 passes through the tubular member 18 it also is out of the way and there is little likelihood of the child injuring himself in operating the vehicle. If desired, I may provide a curved cover member 73, spanning the space between the frame plates 62 and 63, over the upper end of the steering link 56, as clearly illustrated in Fig. 1.

From the foregoing it will be apparent that I have devised an improved velocipede with steerable rear wheels in which the steering mechanism is both simple and fully effective for its intended purposes.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a velocipede, a frame, a front wheel carrying fork rigidly connected to the front end of the frame, a front wheel mounted for rotation in the fork and having foot pedals operatively connected thereto for rotating the front wheel, a vertically disposed tubular member secured to the rear of the frame, a horizontal transversely disposed rear wheel frame carried by the tubular member, steerable rear wheels mounted adjacent each end of the wheel frame, a steering link extending through the vertically directed tubular member and pivoted thereto intermediate the ends of the link, a manually operable steering member connected to the link near the upper end of the latter, and an operating connection between the wheels and the lower end of said link whereby the rear wheels steer in unison upon movement of the steering member.

2. In a velocipede, a horizontal frame member, a front fork and pedal driven wheel assembly with the fork rigidly secured to the frame near the front end of the frame, a depending hollow frame member secured to the rear end of the horizontal frame, a horizontal rear wheel frame secured to the lower end of the hollow frame member, pivotally mounted steerable rear wheels carried by the wheel frame, a steering link passing through the hollow frame member and pivoted thereto intermediate its ends for side to side oscillation, a manually operable steering member operatively connected to the end of the link above the pivot point thereof for oscillating the same, and means operatively connecting the link below the pivot point thereof to said wheels whereby the wheels pivot in unison upon movement of the link.

3. In a velocipede, a frame, a front wheel carrying fork rigidly connected to the front end of the frame, a front wheel mounted for rotation in the fork and having foot pedals operatively connected thereto for rotating the front wheel, a vertically disposed tubular member secured to the rear of the frame, a steering link extending through said tubular member and pivotally connected thereto intermediate the ends of the link, a horizontal transversely disposed rear wheel frame mounted on the lower end of the tubular member, vertically disposed pins mounted for oscillation in the rear wheel frame near the outer ends thereof, horizontally disposed pulley-like members non-rotatably secured to the pins, a member cross connecting the pulley-like members, means operatively connecting said steering link to said member cross connecting the pulley-like members for moving the same transversely thereby to oscillate the pins in unison, and axle and rear wheel assemblies carried by the pins.

4. A velocipede as defined in claim 3 in which the member cross connecting said pulley-like members is a flexible cable secured to the peripheries of the pulley-like members.

References Cited in the file of this patent
UNITED STATES PATENTS

| | | |
|---|---|---|
| 1,117,419 | Miller | Nov. 17, 1914 |
| 1,177,717 | Markmann | Apr. 4, 1916 |
| 1,493,895 | Reed | May 13, 1924 |
| 2,207,161 | Roe | July 9, 1940 |